United States Patent [19]

Bernardi et al.

[11] 3,901,942
[45] Aug. 26, 1975

[54] TETRACYCLINE DERIVATIVES SUBSTITUTED IN THE 7 POSITION AND PROCESS FOR PREPARING THE SAME

[75] Inventors: Luigi Bernardi; Vincenzo Colonna; Roberto De Castiglione; Paolo Masi, all of Milan, Italy

[73] Assignee: Societa' Farmaceutici Italia S.p.A., Milan, Italy

[22] Filed: Sept. 17, 1973

[21] Appl. No.: 397,691

[30] Foreign Application Priority Data
Sept. 18, 1972 Italy................................. 29328/72

[52] U.S. Cl. ........................................ 260/559 AT
[51] Int. Cl.² ........................................ C07C 103/19
[58] Field of Search ............................ 260/559 AT

[56] References Cited
UNITED STATES PATENTS

| | | |
|---|---|---|
| 3,148,212 | 9/1964 | Boothe et al................. 260/559 AT |
| 3,165,551 | 1/1965 | Blackwood et al............ 260/559 AT |
| 3,226,436 | 12/1965 | Petisi et al.................... 260/559 AT |
| 3,373,196 | 3/1968 | Bitha et al.................... 260/559 AT |
| 3,403,179 | 9/1968 | Zambrano..................... 260/559 AT |

*Primary Examiner*—C. Davis
*Attorney, Agent, or Firm*—Hubbell, Cohen & Stiefel

[57] ABSTRACT

Process for the preparation of tetracycline derivatives substituted in the 7 position comprising first obtaining tetracycline derivatives substituted in the 7 and 9 positions, transforming the substituent in the 7 position into the desired substituent, and then eliminating the substituent in the 9 position. Invention further comprises products obtained during the course of the above process.

5 Claims, No Drawings

TETRACYCLINE DERIVATIVES SUBSTITUTED IN THE 7 POSITION AND PROCESS FOR PREPARING THE SAME

BACKGROUND OF THE INVENTION

1. Field of the Invention

The present invention relates to a process for the preparation of tetracycline derivatives substituted in the 7 position and to various new products obtained by said process.

More particularly, the present invention provides a new process for the preparation of tetracycline derivative compounds substituted in the 7 position, said compounds having the following structural formula:

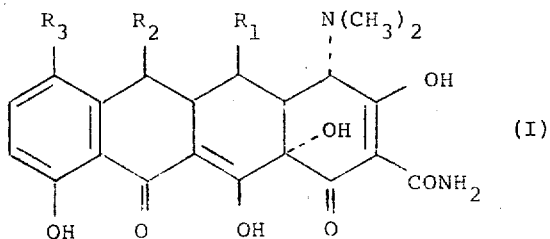

wherein $R_1$ may be hydrogen, hydroxy, or acyloxy having from 1 to 4 carbon atoms; $R_2$ may be hydrogen or methyl; $R_3$ may be nitro-, amino-, monoalkylamino- or dialkylamino- wherein the alkyl group(s) have from 1 to 4 carbon atoms, methyl, benzyl, aminomethyl, acylaminomethyl, carbalkoxyaminomethyl, and 4-hydantoinyl.

The process of the present invention involves first obtaining the corresponding derivatives substituted in the 7 and 9 positions, said derivatives being of the formula:

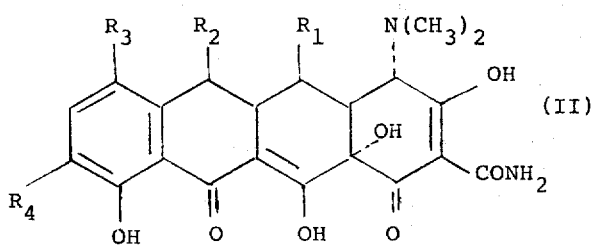

wherein $R_1$, $R_2$ and $R_3$ are as defined above and $R_4$ is a radical selected from the group consisting of alkyl, alkenyl, cycloalkyl, and cycloalkenyl, said radical having from 4 to 10 carbon atoms.

The present invention further includes the derivatives above mentioned and the process for their preparation. Said derivatives are new and useful per se as chemotherapeutics and are also useful as intermediates for the preparation of the compounds of formula I.

2. Description of the Prior Art

From the literature there are a number of know methods for introducing a nitro, amino, monoalk-ylamino or dialkylamino group in the 7 position of tetracyclines. See, e.g., J. J. Beereboom et al, J. Am. Chem. Soc. 82, 1960, page 1003; J. H. Boothe et al, J. Am. Chem. Soc. 82, 1960, page 1253; U.S. Pat. Nos. 3,338,968, 3,148,212, and 3,226,436.

According to the methods described in these references, in order to prepare derivatives having an amino, monoalkylamino or a dialkylamino group in the 7 position, it is necessary to initially obtain the corresponding 7-nitro derivative.

This is a considerable disadvantage, inasmuch as nitration of tetracyclines having free 7 and 9 positions inevitably affords mixtures of 7- and 9-nitro derivatives, in which the 9-nitro derivative preponderates over the 7-nitro derivative. This necessitates the troublesome and difficult task of separating the two isomers, inasmuch as only the 7-nitro isomer, formed in minor quantity, is employed in the subsequent synthesis.

Accordingly, prior to the present invention, compounds of great therapeutic interest such as, for instance, 7-dimethylamino-6-deoxy-6-demethyltetracycline, appeared to be available only with difficulty, due to the high cost of manufacture.

SUMMARY OF THE INVENTION

We have now surprisingly found that said tetracycline derivatives, mono-substituted in the 7 position, can be favorably prepared in high yield and obtaining single products, by starting with the corresponding compounds having the 7 position free, as shown by formula IV hereinafter.

The process of the present invention, which hereinafter is illustrated in detail, comprises a selective alkylation of a compound of formula IV to give the corresponding mono-derivative substituted in the 9 position and shown in formula III, which mono-derivative is then subjected to an electrophilic substitution reaction in the 7 position to give the derivative of formula II wherein $R_3$ can be any substituent and in particular can be nitro benzyl, acylaminomethyl, carbalkoxyaminomethyl, 4-hydantoinyl, and their analogues. The 7-derivatives (formula II) thus obtained can be isolated as such, or can be transformed by known reactions into the corresponding 7-amino-, 7-monoalkylamino or 7-dialkylamino-derivative wherein the alkyl group(s) have from 1 to 4 carbon atoms, or to the corresponding 7-methyl or 7-aminomethyl-derivative.

Subsequently this derivative (formula II) can be treated under suitable conditions so as to eliminate the alkyl radical $R_4$ in the 9 position thereby resulting in the desired derivative mono-substituted in the 7 position (formula I).

DESCRIPTION OF THE PREFERRED EMBODIMENTS

The following reaction scheme illustrates the process of the present invention:

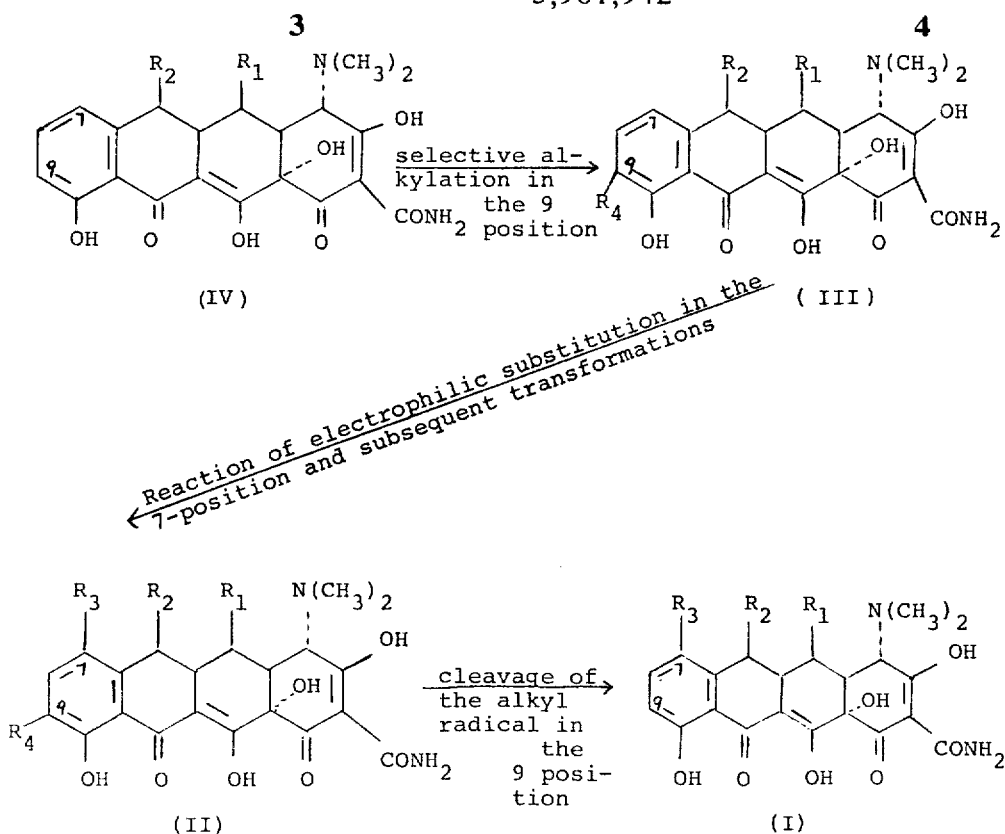

wherein R₁, R₂, R₃ and R₄ are as defined above.

The technical improvement of the process of the present invention is evident if one considers that while it was known from the prior art that electrophilic substitutions on compounds of formula IV lead predominantly to products substituted in the 9 position, which products exhibit low antibiotic activity, with the present process one proceeds first with the introduction of a substituent in the 9 position, then with electrophilic substitution (for instance, nitration) in the 7 position, which position is the only reactive position left free, and finally the protective group in position 9 can be subsequently eliminated, as by an acid treatment, to give the desired mono-substituted derivative in the 7 position (formula I).

The selective alkylation in the 9 position of the starting product (IV) can be carried out by treating said product at room temperature with an appropriate compound, such as an alcohol, an alkyl halide, an alkenyl halide, a secondary or tertiary cycloalkyl halide or cycloalkenyl halide; or an olefin having from 4 to 10 carbon atoms, in the presence of a strong acid that is unable per se to attack the D-ring of tetracycline.

As the strong acid there can be used methansulphonic acid, ethansulphonic acid, ethanolsulphonic acid, trifluoromethansulphonic acid, or hydrogen fluoride.

If desired, the alkylation reaction can take place in the presence of a suitable solvent such as dimethoxyethane, diglyme, dioxan, or hexamethylphosphotriamide. However, the use of a solvent is not essential.

At the end of the reaction the product alkylated in the 9 position (formula III) can be isolated and purified according to conventional methods. It is preferred to dilute the reaction mixture with water, then extract the product with a water-immiscible solvent, then concentrate to a small volume, and then insolubilize, for example, by adding ethyl ether or petrol ether.

The product thus obtained (formula III) is subjected to an electrophilic substitution reaction in the 7 position. The substituent that enters in the 7 position can be virtually any desired substituent, preferably nitro, benzyl, acylaminomethyl, 4-hydantoinyl, and their analogues. The experimental conditions to carry out this electrophilic substitution are well known to those skilled in the art. Details are reported in the illustrative examples hereinafter.

Generally, operations are carried out in anhydrous acid medium, employing an acid such as an alkylsulfonic acid, trifluoroacetic acid, hydrogen fluoride and their analogues, at a temperature of from about 0°C to 50°C.

The introduction of a nitro group can be effected with the usual nitrating agents. It is sometimes preferable to operate with nitrates in the presence of strong acids. The introduction of a carbalkoxy-aminomethyl group can be performed by reaction with a methylene bis-alkylurethane. The introduction of a hydantoinyl can be performed by reaction with 5-alkoxy-hydantoin. The introduction of an acylaminomethyl group can be performed by reaction with an N-hydroxymethylamide of a suitable acid, such as trifluoroacetic acid.

It is to be understood that the present invention also contemplates the usual conversion of the group in the 7 position (performed on the corresponding tetracycline of structure II) into another group, as by reduction, alkylating reduction, oxidation, or acylation.

In particular there is contemplated the conversion of the 7-nitro group into the 7-amino group, the conversion of the 7-amino group into the 7-mono or 7-dialkylamino group, the conversion of a 7-aminomethyl group into 7-methyl group, and their analogues.

Nitration of a compound of structure (III) can be carried out directly, as is shown in the subsequent examples. The nitration can be performed with a suitable nitrate in the presence of a cold strong acid, preferably at from about −5° to +20°C. Generally sodium or potassium nitrate and hydrogen fluoride are preferred. Good results may also be obtained with concentrated anhydrous sulfuric acid. The reaction time is rather short, usually from a few minutes to one hour.

At the end of the reaction the nitration product can be isolated and purified according to conventional methods, bearing in mind that, in contrast to the prior art, the 7-nitro-derivative is always formed inasmuch as the 9 position is already occupied.

In the particular case of nitration in hydrogen fluoride of 6-demethyl-6-deoxy-9-alkyl-tetracycline (compound III wherein $R_1=R_2=H$), at the end of the reaction the residue is concentrated to a small volume and taken up with a water-miscible solvent such as alcohol and a lower ketone, e.g., ethanol and acetone.

By adding a lower alkyl ether such as ethyl ether, the raw product precipitates, and is then dissolved in water. The pH is adjusted to a value of about 5, and then the aqueous solution is extracted with a water-immiscible solvent such as ethyl acetate. Dilution with ethyl ether and petrol ether causes the precipitation of the 6-demethyl-6-deoxy-7-nitro-9-alkyl-tetracycline, which can be either isolated and characterized as such, or can be subjected to one of the conversions of 7-nitro groups as above described.

In particular, 6-demethyl-6-deoxy-7-nitro-9-alkyl-tetracycline can be reduced both chemically and catalytically to give the corresponding 6-demethyl-6-deoxy-7-amino-9-alkyl-tetracycline. The catalytic reduction can be performed in a polar solvent such as water, lower alcohols, inorganic acids or lower organic acids, or mixtures thereof, in the presence of a catalyst, desirably a noble metal such as palladium, rhodium, or platinium, finely divided or deposited on a conventional carrier, for instance, palladium-on-carbon. Also noble metal compounds such as $PtO_2$ can be advantageously employed.

The conditions of the catalytic reduction are not critical. Generally it is preferred to operate at room temperature and pressure. At the end of the reduction, the 6-demethyl-6-deoxy-7-amino-9-alkyl-tetracycline thus formed can be isolated from the reaction mixture according to the conventional methods for these products. Generally, after filtration of the catalyst it is preferred to concentrate to a small volume and then, by the addition of ethyl ether, the desired product, i.e., 6-demethyl-6-deoxy-7-amino-9-alkyl-tetracycline, crystallizes.

Said product, dissolved in alcohol, is then subjected to reduction alkylation with a carbonyl compound having from 1 to 4 carbon atoms, in the presence of a suitable catalyst of the type used for the reduction of the above mentioned 7-nitro-group.

The other experimental conditions for this alkylating reduction are not critical. Generally it is preferable to operate at room pressure and temperature. At the end of reduction the catalyst is filtered, the solution is concentrated to a small volume, and the product crystallizes with ethyl ether.

Alternatively there can be advantageously carried out in only one step the reduction of 7-nitro-group and the following alkylation reduction in the presence of an aldehyde or of a ketone having from 1 to 4 carbon atoms.

After the compound of structure II is obtained, the protective group in the 9 position is eliminated, as by cleavage, to obtain, finally, the desired compound of structure I. Said elimination can be carried out treating the compound of structure II with the same acids employed for the selective alkylation (step IV---III) previously discussed.

The cleavage reaction can take place, if desired, in the presence of acceptors of carbocations, such as anisole, resorcin and ethers thereof, fluoroglucine and ethers thereof, dialkylsulfides mercaptans, methionine, tryptophane, and analogues thereof. The experimental conditions are identical to those of the selective alkylation above mentioned.

At the end of the reaction the desired product of structure I is isolated from the reaction mixture and purified according to conventional methods for these types of compounds. Generally, it is preferable to insolubilize the raw material by adding a suitable solvent, to redissolve it in water, to adjust the pH to a convenient level, and to extract the product with a water-immiscible solvent. Upon concentration, the desired product crystallizes.

In particular, to obtain 7-dimethylamino-6-demethyl-6-deoxytetracycline (Compound I, wherein $R_1 = R_2 =$ H and

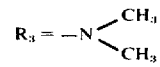

it is preferable to operate as follows.

7-dimethylamino-6-demethyl-6-deoxy-9-alkyl-tetracycline is dissolved in one of the above mentioned acids, such as methansulfonic acid, optionally in the presence of resorcin or anisole, and left at room temperature for about 2 to 30 hours. The reaction product is then precipitated by the addition of ethyl ether. The raw material is dissolved in alcohol and decolorized by charcoal. The raw material precipitates by concentration of the filtered solution and subsequent dilution with ethyl ether. It is then dissolved in water, the pH value of the obtained solution is adjusted to a value of about 6, and the product is extracted thoroughly with chloroform. The chloroform extract is concentrated to a small volume. The 7-dimethyl-amino-6-demethyl-6-deoxytetracycline, having the same characteristics as a sample prepared according to the literature of the same antibiotic known under the generic name of Minocyclin (J. Med. Chemistry 10, 1967, page 44) crystallizes upon dilution with a suitable solvent, such as ethyl ether and petrol ether.

The following examples will further illustrate the invention. All parts are by weight unless otherwise stated.

EXAMPLE 1

9-t.butyl-6-demethyl-6-deoxytetracycline 10.5 g of 6-demethyl-6-deoxytetracycline hydrochloride were dissolved in 70 ml of methansulfonic acid. 25 ml of hexamethylphosphotriamide were added and the solution was saturated with isobutylene at 15°C. After stirring for 5 hours at room temperature the reaction mixture was diluted with 200 ml of water and extracted three times with n-butanol. The butanol extracts were washed with water and evaporated to a small volume. Upon dilution with ether a solid was separated. The solid was suspended in 150 ml of water, the pH value was adjusted to 5 with NaOH(4N) and then extracted three times with ethyl acetate.

The extracts were dried over anhydrous sodium sulfate, concentrated "in vacuo" to a small volume, and diluted with petrol ether. Then 9-t.-butyl-6-demethyl-6-deoxytetracycline was separated. U.V. Spectrum in MeOH/HCl 0.01N: $\lambda_{max}$ 275 and 345 nm ($E_{275}/E_{345}$=1.2).N.M.R. Spectrum (CDCl$_3$):1.40 $\delta$ (C(CH$_3$)$_3$); 6.53 and 7.33 $\delta$ (d, J-8Hz; aromatic protons).

EXAMPLE 2

9-t.butyl-6-demethyl-6-deoxytetracycline 0.50 g of 6-demethyl-6-deoxytetracycline was dissolved in 5 ml of methansulfonic acid. 3 ml of t.butanol were added and the whole was stirred for 22 hours at room temperature. The solution was diluted with water and the product extracted with butanol.

The butanol extracts were worked up as in Example 1. 9-t.butyl-6-demethyl-6-deoxytetracycline were obtained having the same characteristics as that of Example 1.

EXAMPLE 3

7-nitro-9-t.butyl-6-demethyl-6-deoxytetracyline

In a Teflon reactor 4.4 g of 9-t.butyl-6-demethyl-6-deoxytetracycline were dissolved in 50 ml of anhydrous hydrogen fluoride. 1 g of potassium nitrate was added and external cooling was effected with ice. The whole was stirred for 5 minutes and the hydrogen fluoride was evaporated.

The residue was taken up with acetone and methanol, filtered, decolored and concentrated. Upon diluting with ethyl ether a solid precipitated, which solid was dissolved with water. The pH value of the solution was adjusted to 5.3 and the product was extracted with ethyl acetate. The extracts were washed with water, dried over anhydrous sodium sulfate, concentrate, and diluted with ether and petrol ether to give 7-nitro-9-t.butyl-6-demethyl-deoxytetracyline. U.V.Spectrum in MeOH/HCl 0.01N: $\lambda_{max}$268 and 350 ($E_{268}/E_{350}$=1.46). N.M.R.Spectrum (CDCl$_3$): 1.43 $\delta$, $\beta$[C(CH$_3$)$_3$] 8.05 $\delta$, $\beta$(C$_8$—M aromatic).

EXAMPLE 4

7-nitro-9-t.butyl-6-demethyl-6-deoxytetracycline 6-demethyl-6-deoxytetracycline (1g) was dissolved in 3 ml of t.butanol and 5 ml of methansulfonic acid, and the mixture was maintained with stirring for 12 hours at 30°C. 0.960 g of potassium nitrate was then added and the whole was maintained with stirring for 6 hours at 30°C. The mixture was poured on ice and the aqueous solution thus obtained was adjusted to a pH value of 5.5 with 5N aqueous sodium hydroxide, and then extracted with chloroform. The chloroform solution was washed with distilled water, dried over anhydrous sodium sulfate, and concentrated to a small volume "in vacuo". On addition of petroleum either the desired product precipitated. After 1 hour in a refrigerator the product was filtered and dried in vacuo for 2 hours at 50°C. 0.950 g of the product was obtained, having the same characteristics as reported in Example 3.

EXAMPLE 5

7-amino-9-t.butyl-6-demethyl-6-deoxytetracycline

A solution of 0.88 g of 7-nitro-9-t.butyl-6-demethyl-6-deoxytetracycline in 60 ml of methanol containing 4.1 ml of HCl(1N), was hydrogenated at room temperature and pressure in the presence of 0.25 g of PtO$_2$. The whole was filtered, concentrated, diluted with isopropanol, reconcentrated, and then precipitated with ether. The resulting solid consisted of 7-amino-9-t.butyl-6-demethyl-6-deoxytetracycline dihydrochloride. U.V. Spectrum in MeOH/HCl 0.01N: $\lambda_{max}$ 269 and 349nm. ($E_{269}/E_{349}$ = 1.52) N.N.R. Spectrum [DMSO-d$_6$]:

1.30 $\delta$, $\beta$[C(CH$_3$)$_3$]

7.69 $\delta$, $\beta$[C$_8$-H aromatic].

EXAMPLE 6

7-dimethylamino-9-t.butyl-6-demethyl-6-deoxytetracycline 0.85 g of 7-amino-9-t.butyl-6-demethyl-6-deoxytetracycline dihydrochloride was dissolved in 80 ml of methanol. 0.25 g of palladium charcoal (10% Pd) and 3.2 ml of aqueous formaldehyde (40%) were added, and then hydrogenation was effected at room temperature and atmospheric pressure.

7-dimethyl-amino-9-t.butyl-6-demethyl-6-deoxytetracycline dihydrochloride was filtered, concentrated, and precipitated with ether. U.V.Spectrum in MeOH/HCl 0.01N: $\lambda_{max}$269 and 353 nm ($E_{269}/E_{353}$=1.42) N.M.R. Spectrum (CDCl$_3$):

1.42 $\delta$, $\beta$[C(CH$_3$)$_3$]

2.45 $\delta$, $\beta$[N(CH$_3$)$_2$]

2.59 $\delta$, $\beta$[N(CH$_3$)$_2$]

7.22 $\delta$, $\beta$[C$_8$—H aromatic]

Similar results were achieved by carrying out the reduction of 7-nitro-9-t.butyl-6-demethyl-6-deoxytetracycline in the presence of formaldehyde, thereby directly obtaining 7-dimethylamino-9-t.butyl-6-deoxytetracycline.

EXAMPLE 7

7-dimethylamino-9-t.butyl-6-demethyl-6-deoxytetracycline

A solution of 7-nitro-9-t.butyl-6-demethyl-6-deoxytetracycline (7.2 g) in 250 ml of methanol and 16 ml of aqueous 2N hydrochloric acid was hydrogenated in the presence of PtO$_2$ catalyst (2 g) at room temperature and atmospheric pressure.

The reduction was complete after about 2 hours. Without isolating the product, the catalyst was eliminated by filtration and 2 g of Pd/C (10% Pd) and 25 ml of 40% aqueous solution of formaldehyde were added, and the whole was hydrogenated at room temperature and atmospheric pressure, until the absorption of hydrogen ceased. The catalyst was eliminated by filtration and all the alcohol was evaporated "in vacuo". The residue was taken up with water.

The pH of the aqueous solution was adjusted to 6.5 with 2N aqueous sodium hydroxide and extracted with CHCl$_3$. The chloroform solution was washed with distilled water and dried over anhydrous sodium sulfate. The whole was concentrated to a small volume in vacuo, and the product was precipitated with petroleum ether. It was filtered and dried.

5.6 g of product were obtained. Mother liquors, concentrated to very small volume, give a further 200 mg of product. Total yield was 5.8 g (80.6%).

EXAMPLE 8

7-dimethylamino-6-demethyl-6-deoxytetracycline 0.70 g of 7-dimethylamino-9-t.butyl-6-demethyl-6-deoxytetracycline was dissolved in 8 ml of trifluoromethansulfonic acid and left for 30 hours. The whole was poured into 600 ml of ethyl ether and filtered. The filtrate was dissolved again in methanolisopropanol, the solution was decolored with charcoal, concentrated to small volume, and diluted with ether. The separated solid was dissolved in 50 ml of water. The pH value of the solution was adjusted to 6.5 with sodium hydroxide solution. This was extracted four times with chloroform. The organic layer was concentrated to a small volume. Upon dilution with ethyl ether and petroleum ether there precipitated 7-dimethylamino-6-dimethyl-6-deoxytetracycline, which had the same characteristics as the sample prepared according to the literature [J. Med. Chemistry, 10, 44 (1967)].

EXAMPLE 9

7-dimethylamino-6-demethyl-6-deoxytetracycline (Minocyclin)

A 5 g solution of 7-dimethylamino-9-t.butyl-6-demethyl-6-deoxytetracycline in 2.5 ml of anisole and 50 ml of trifluoromethansulfonic acid was heated at 60°C for 8 hours and kept at room temperature for 12 hours. The trifluoromethansulfonic acid was then distilled in vacuo (28°–30°C at 0.6 mmHg), recovering 35 ml of it (70%), while the residue was poured on ice. The pH of the resulting solution was adjusted to 6.5 with 5N aqueous sodium hydroxide. Some tar separated. The pH of the solution was adjusted to a value of 2 with aqueous (2N) hydrochloric acid. The solution was decanted and the aqueous solution was washed with ethyl ether to eliminate anisole. The pH was then adjusted to 6.5 with 2N aqueous sodium hydroxide and extracted with chloroform. The organic layer was then washed with distilled water, dried over anhydrous sodium sulfate, and evaporated in vacuo to dryness.

The residue was dissolved in 20 ml of methylene chloride, and the product was precipitated by the addition of petroleum ether (200 ml). The whole was concentrated to 70 ml and brought again to a volume of 250 ml with petroleum ether. The precipitate was filtered and dried (2 g). Tars were dissolved in methanol and the solution thus obtained was adjusted to a pH value of 6.5 with 2N aqueous sodium hydroxide. The solution was evaporated in vacuo to dryness, the residue was taken up with water and was extracted several times with chloroform (total 500 ml). The solution was dried over anhydrous sodium sulfate and evaporated in vacuo to dryness. The residue was precipitated by adding petroleum ether (100 ml). It was concentrated to about 30 ml and the concentrated solution was then diluted to 120 ml with petroleum ether. The precipitate was filtered and dried (800 mg). A total of 2.8 g of 7-dimethylamino-6-dimethyl-6-deoxytetracycline (Minocyclin) was obtained. (Yield = 63%). Minocyclin base was transformed to the monohydrochloride in the known manner. The monohydrochloride was subjected to spectroscopic analysis (U.V., I.R. and N.M.R. in DMSO-6d), with results that were identical to those reported in the literature.

EXAMPLE 10

9-t.butyl-alpha-6-deoxy-5-hydroxytetracycline 3 g of alpha-deoxy-5-hydroxytetracycline hydrochloride were dissolved in 20 ml of methansulfonic acid and the solution was saturated with isobutylene as 15°C. After stirring for 5 hours at room temperature, the solution was diluted with 800 ml of ethyl ether and filtered. The residue was dissolved in 60 ml of water, the pH was adjusted to between 5 and 5.2 by the addition of sodium hydroxide solution, and was extracted with ethyl acetate.

The organic layer was washed with water, dried over anhydrous sodium sulfate, and concentrated to a small volume. Upon adding ethyl ether and petroleum ether, 9-t.butyl-alpha-6-deoxy-5-hydroxytetracycline was obtained. U.V.Spectrum in MeOH/HCl 0.01N: $\lambda_{max}$272 and 346 nm.($E_{272}/E_{346}$=1.32) N.M.R. Spectrum[DMSO-$d_6$]:1.36 [C(CH$_3$)$_3$]; 6.80 and 7.48 ($d$,J=8Hz aromatic protons).

EXAMPLE 11

9-adamanthyl-alpha-6-deoxy-5-hydroxytetracyline 1 g of alpha-6-deoxy-5-hydroxytetracycline hydrochloride was dissolved in 10 ml of methansulfonic acid. 0.380 g of 1-hydroxy-adamanthane and 0.3 ml of hexamethylphosphotriamide were added and the whole was permitted to stand for 4 hours at room temperature with stirring.

The solution was diluted with 300 ml of ethyl ether. The precipitated solid was dissolved in 40 ml of water, the pH value was adjusted to 4.6 with sodium hydroxide solution, followed by extraction with ethyl acetate. The organic layer was washed with water, dried over anhydrous sodium sulfate, and concentrated to a small volume. Upon adding ether and petroleum ether, 9-adamanthyl-alpha-6-deoxy-5-hydroxytetracycline was obtained. U.V. Spectrum in MeOH/HCl 0.01N: $\lambda_{max}$272 and 346 nm.($E_{272}/E_{346}$=1.26) N.M.R. Spectrum(CDCl$_3$): 1.65 and 2.09 $\delta$(m, methylenes of adamanthane); 6.85 and 7.35 $\delta$($d$,J=8Hz, aromatic protons).

EXAMPLE 12

9-adamanthyl-6-demethyl-6-deoxytetracycline 0.500 g of 6-demethyl-deoxytetracycline was dissolved in 5 ml of methansulfonic acid. 0.260 g of 1-hydroxy-adamanthane and 0.5 ml of hexamethylphosphotriamide were added, and the whole was left for 5 hours at room temperature with stirring.

Operating as in Example 11, 9-adamanthyl-6-demethyl-6-deoxytetracycline was obtained. U.V.Spectrum in MeOH/HCl 0.01N: $\lambda_{max}$275 and 350 nm.($E_{275}/E_{350}$=1.38) N.M.R.Spectrum[COCl$_3$]: 1.78 and 2.12 $\delta$(m, methylenes of adamanthane); 6.39 and 7.27 $\delta$($d$, J=8Hz; aromatic protons).

EXAMPLE 13

6-demethyl-6-deoxy-7-(N-carbethoxy-aminomethyl)-9-t.butyl-tetracycline 1.08 g of 6-demethyl-6-deoxy-9-t.butyl-tetracycline and 0.410 g of methylene-bis-ethylurethane were dissolved in 20 ml of trifluoroacetic acid and stirred for 16 hours at room temperature.

The trifluoroacetic acid was evaporated off in vacuo, the residue was taken up with 30 ml of ethyl acetate, concentrated to small volume, a few drops of isopropanol were added, and the product was precipitated with ethyl ether. The solid obtained by filtration was washed with ethyl ether and was dissolved in ethyl acetate. The pH value of the solution is adjusted to 7 with triethylamine, followed by washing three times with water. The whole was dried over anhydrous sodium sulfate, concentrated nearly to dryness, ethyl ether (20 ml) was added, the solution was evaporated to a small volume (4–5 ml), and the product was precipitated with petroleum ether. U.V.Spectrum in MeOH/HCl 0.01N: $\lambda_{max}$273 and 345 nm.($E_{273}/E_{345}$=1.22). N.M.R.Spectrum[CDCl$_3$]:1.21 $\delta(t,$=7Hz,—CH$_3$);1.38 $\delta[s,$—C(CH$_3$)$_3$]; 4.10 $\delta(q)$=7Hz, CH$_2$CH$_3$); 7.30 $\delta(s,C_8$—H aromatic).

EXAMPLE 14

7-hydantoinyl-9-t.butyl-6-demethyl-6-deoxytetracycline 3 g of 9-t.butyl-6-demethyl-6-deoxytetracycline base were dissolved in 40 ml of trifluoro-acetic acid. 1.4 g of 5-n.butoxy-hydantoine and 3 ml of methansulfonic acid were added. The whole was allowed to stand for three days at room temperature and was then evaporated in vacuo to dryness. The residue was taken up with isopropanol and was precipitated with ethyl ether. The precipitate was dissolved in water, the pH-value was adjusted to 5 with sodium hydroxide solution, followed by extraction with ethyl acetate. The extracts were washed with water, decolored and dried over anhydrous sodium sulfate. It was then concentrated and precipitated with petroleum ether. U.V.Spectrum in MeOH/HCl 0.01N: $\lambda_{max}$272 and 345 nm.($E_{272}/E_{345}$=1.15) N.M.R.Spectrum[CDCl$_3$+DMSO $d_6$]:1.38$\delta[s,$—C(CH$_3$)$_3$]; 5.26 $\delta$ (s, C$_5$—H of hydantoin); 7.35 $\delta(s,$ C$_8$—H aromatic).

EXAMPLE 15
Dealkylation of 9 -t.butyl-alpha-6-deoxy-5-hydroxytetracycline 0.500 g of 9-t.butyl-alpha-6-deoxy-5-hydroxytetracycline (Example 10) was dissolved in 5 ml of methansulfonic acid and the whole was allowed to stand for 2 hours at room temperature, followed by dilution with 400 ml of ether. The separated solid was dissolved in water and the pH value of the solution was adjusted to 5 with NaOH, followed by extraction with butanol. The butanol extract was concentrated to a small volume. Upon dilution with ether the alpha-6-deoxy-5-hydroxytetracycline was separated, and the product exhibited the same characteristics as those for a sample prepared according to the literature [J.Am.Chem.Soc., 85, 2643, (1963)].

EXAMPLE 16

7-nitro-9-t.butyl-6-demethyl-6-deoxytetracycline 0.37 g of 9-t.butyl-6-demethyl-6-deoxytetracycline and 0.12 g of NO$_2$BF$_4$ 95% (10% excess) was dissolved in 10 ml of HF cooled to −60°C. The solution were immediately evaporated under reduced pressure and the residue was dissolved in acetone. The acetone solution was decolored with charcoal and concentrated to a small volume. Upon dilution with ethyl ether-petroleum ether, the raw hydrofluoride precipitated. The precipitate was dissolved in water and the solution was extracted with ethyl-ether acetate. The pH value was adjusted to 5.2 with NaOH(2N). The organic layer was separated and the aqueous layer was extracted 4 times with ether.

The collected extracts were washed with water, dried over anhydrous sodium sulfate and concentrated to a small volume.

0.25 g of 9-t.butyl-7-nitro-6-demethyl-6-deoxytetracycline were obtained by dilution with petroleum ether. This product had the same characteristics as those reported in Example 3.

EXAMPLE 17

6-demethyl-6-deoxy-7-hydantoinyltetracycline 2 g of 9-t.butyl-6-demethyl-6-deoxy-7-hydantoinyltetracycline were dissolved in 1 ml of anisole and 30 ml of anhydrous hydrogen fluoride and the resulting solution was permitted to stand for 3 days.

The excess of hydrogen fluoride was evaporated, the residue was dissolved methanol, the solution was decolored with charcoal and was then concentrated to a very small volume. Upon dilution with isopropanol-ethyl ether, 6-demethyl-6-deoxy-7-hydantoinyltetracycline hydrofluoride precipitated. U.V.Spectrum in CH$_3$OH—HCl 0.01N: $\lambda_{max}$=270 and 348 nm with $E_{270}/E_{348}$=1.28; N.M.R.Spectrum (DMSO-d$_6$) 2.33 $\delta$

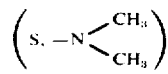

5.35 $\delta$ (S wide, C$_5$—H of hydantoin)
6.71 $\delta$, $d$ } aromatic
7.23 $\delta$, $d$

EXAMPLE 18

9-t.butyl-6-demethyl-6-deoxy-7-[5'-(1'-methyl)hydantoinyl]tetracycline 5 g of 9-t.butyl-6-demethyl-6-deoxytetracycline were dissolved in 50 ml of trifluoroacetic acid. 2.4 g of 1-methyl-5-n-butoxy-hydantoin and 4 ml of methansulfonic acid were added and the whole was kept at room temperature for 48 hours. The excess trifluoroacetic acid was evaporated and the residue was taken up with methanol. The solution was decolored with charcoal and concentrated to a small volume. The product was precipitated upon dilution with isopropanol-ether. The solid was filtered and dissolved in water, the pH value was adjusted to 5.2 with NaOH(4N) followed by extraction with ethyl acetate, washing with water, drying over sodium sulfate, and concentrating to a very small volume. Upon dilution with petroleum ether-ethyl ether, 9-t.butyl-6-demethyl-6-deoxy-7-[5'-(1'-methyl)hydantoinyl]tetracyline precipitated. U.V.-Spectrum in CH$_3$OH.HCl 0.01N: $\lambda_{max}$272 and 345 m$\mu$ with $E_{272}/E_{345}$ = 1.26
N.M.R.Spectrum (CDCl$_3$):
1.38 $\delta[S,$ — C(CH$_3$)$_3$]

2.43 δ [S, —N(CH$_3$)$_2$]
2.78 δ (S, N—CH$_3$ of hydantoin)
5.05 δ (S, C$_5$—H of hydantoin)
7.05 δ (S, C$_R$—H)

EXAMPLE 19

6-demethyl-6-deoxy-7-[5'-(1'-methyl)hydantoinyl]tetracyline 0.750 g of 9-t.butyl-6-demethyl-6-deoxy-7-[5'-methyl)hydantoinyl]tetracycline was treated with 0.5 ml of anisole and 15 ml of anhydrous hydrogen fluoride for 4 days. The hydrogen fluoride was evaporated in vacuo and the residue was dissolved in acetone and methanol, decolored with charcoal, and concentrated to a small volume. Upon dilution with ether, 6-demethyl-6-deoxy-7-[5'-(1'-methyl)hydantoinyl]tetracycline hydrofluoride was obtained. U.V.Spectrum in CH$_3$OH.HCl 0.01N: λ$_{max}$ 270 and 353 mμ with E$_{270}$/E$_{353}$ = 1.35
N.M.R.Spectrum (in DMSO-d$_6$):
2.52 δ (S, N—CH$_3$ of hydantoin)
2.75 δ

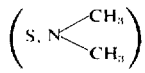

5.22 δ (S wide, C$_5$—H of hydantoin)
7.06 δ, d J=8Hz } aromatic
6.91 δ,d J=8Hz

EXAMPLE 20

9-t.butyl-7-trifluoroacetamidomethyl-6-demethyl-6-deoxytetracyciine

To a solution of 6 g (12.6 m. mol.) of 9-t.butyl-6-demethyl-6-deoxytetracycline in 50 ml of trifluoroacetic acid, 2.75 g (18.9 m. mol.) of N-methylol-trifluoroacetamide were added and the whole was heated at 50°C for 6 hours. Another 2.75 g of N-methylol-trifluoroacetamide were added followed by again heating for 6 hours at 50°C. The solvent was then evaporated in vacuo, the residue was dissolved in ethyl acetate, and the pH was adjusted to a value of 5.5 with triethylamine. The solution was thoroughly washed with distilled water, the organic layer was dried, and the solvent was evaporated in vacuo to dryness. The residue was recrystallized a few times from methylene chloride-petroleum ether (yield 4 g). N.M.R.Spectrum (CDCl$_3$):
1.42 δ (S, (CH$_3$)$_3$C—)
2.47 δ (S, —N(CH$_3$)$_2$)
4.48 δ (S wide, —CH$_2$—N(H) )
7.34 δ (S, C$_R$—H)

EXAMPLE 21

9-t.butyl-7-trichloroacetamidomethyl-6-demethyl-6-deoxytetracyline 4 g of 9-t.butyl-6-demethyl-6-deoxytetracyline and 3.6 g (2 equivalents) of N-chloromethyl-trichloroacetamide were dissolved in 50 ml of trifluoroacetic acid and the resulting solution was kept for 12 hours at room temperature. Another 1.5 g of N-chloromethyl-trichloroacetamide were added and the whole was kept at room temperature for an additional 15 hours. The solution was evaporated in vacuo to dryness, the residue was dissolved in ethyl acetate, and the pH value was adjusted to 6.5 with triethylamine, followed by careful washing with distilled water. The organic layer was then dried over anhydrous sodium sulfate, the solution was evaporated in vacuo to dryness, and the residue was recrystallized twice from methylene chloride-ethyl ether.

A second coup was obtained from the mother liquor by the addition of petroleum ether (total yield of 4.5 g).
N.M.R.Spectrum (CDCl$_3$):
1.41 δ (S, (CH$_3$)$_3$C—)
2.50 δ (S, —N(CH$_3$)$_2$)
4.48 δ (d, J=5.0 Hz, —CH$_2$ $_{NH}$)
7.36 δ (S, C$_R$—H)

In a similar manner, the 7-chloroacetamidomethyl and the ω-chlorobutyramidomethyl-9-t.butyl-6-demethyl-6-deoxytetracyline were obtained.

EXAMPLE 22

7-aminomethyl-9-t.butyl-6-demethyl-6-deoxytetracycline 2 g of 9-t.butyl-7-trichloroacetamidomethyl-6-demethyl-6-deoxytetracycline were dissolved in 30 ml of a solution of 1.5N sodium hydroxide in methanol and stirred for 8 hours at room temperature. The whole was kept overnight in a refrigerator. The reaction mass was then neutralized with 2N aqueous hydrochloride acid and the solid was filtered and washed with a small amount of cold methanol and then with ethyl ether. The product was dissolved in methanol as the dihydrochloride, and the solution was decolored with charcoal followed by neutralization with triethylamine. The separated solid was filtered, washed with methanol, and then with ethyl ether. 1 g of product was obtained (yield of 64.5%). N.M.R.Spectrum (CDCl$_3$+CF$_3$COOH in trace):
1.28 δ (S,(CH$_3$)$_3$C—)
2.85 δ (S,—N(CH$_3$)$_2$)
4.00 δ (widened signal CH$_2$—N(H$_2$) )
7.49 δ (S, C$_R$—H)
The 7-aminomethyl derivative under electrophoresis at a pH value of 1.2 showed a speed rate which was double that of the starting material.

In a similar manner, 7-aminomethyl-9-t.butyl-6-demethyl-6-deoxytetracycline was obtained from 9-t.butyl-7-trifluoroacetamidomethyl-6-demethyl-6-deoxytetracyline. A further method for preparing the 7-aminomethyl-9-t.butyl-6-demethyl-6-deoxytetracycline comprised reacting 9-t.butyl-7-chloroacetamidomethyl-6-demethyl-6-deoxytetracyline with 3-nitro-2-thiopyridone in aqueous sodium bicarbonate and subsequently with trifluoroacetic acid at room temperature.

7-aminomethyl-9-t.butyl-6-demethyl-6-deoxytetracycline can be obtained even more simply by heating a solution of 9-t.butyl-7-chlorobutyramidomethyl-6-demethyl-6-deoxytetracycline in aqueous methanol.

EXAMPLE 23

9-t.butyl-7-dimethylamino-6-demethyl-6-deoxytetracycline 0.85 g of 7-aminomethyl-9-t.butyl-6-demethyl-6-deoxytetracycline dihydrochloride was dissolved in 80 ml of methanol. 0.25 g of 10% palladium-on-carbon and 3.2 ml of 40% aqueous formaldehyde were added, followed by hydrogenation at room temperature and atmospheric pressure. The solution was filtered, concentrated, and upon adding ethyl ether, 7- dimethylaminomethyl-9-t.butyl-6-demethyl-6-deoxytetracycline hydrochloride precipitated.

EXAMPLE 24

9-t.butyl-7-methyl-6-demethyl-6-deoxytetracycline 1.5 g of 9-t.butyl-7-dimethylaminomethyl-6-demethyl-6-deoxytetracycline dihydrochloride were dissolved in 80 ml of methanol and hydrogenated under a pressure of 10 atmospheres and a temperature of 50°C in the presence of 0.300 g of 10% palladium-on-carbon.

The 9-t.butyl-7-methyl-6-demethyl-6-deoxytetracycline hydrochloride was filtered, concentrated, and precipitated with ethyl ether. U.V.Spectrum MeOH/HCl 0.01N: $\lambda_{max}$223,275,343 nm. $E_{27.5}/E_{345}$=1.11 N.M.R.Spectrum (DMSO-d$_6$):

1.31 δ (S,(CH$_3$)$_3$C—)
2.13 δ (S,C$_7$—CH$_3$)
2.85 δ (S,> N$^+$(CH$_3$)$_2$)
7.28 δ (S,C$_8$—H)

EXAMPLE 25

7-methyl-6-demethyl-6-deoxytetracycline 0.4 g of 7-methyl-9-t.butyl-6-demethyl-6-deoxytetracycline hydrochloride was dissolved in 10 ml of anhydrous hydrogen fluoride in the presence of 0.1 ml of anisole. After 3.5 hours at room temperature the hydrogen fluoride was evaporated under reduced pressure, and the residue was transformed to the hydrochloride by treatment with a solution of hydrogen chloride in anhydrous methanol. The solution was then diluted with n-butanol, concentrated to a small volume, and the product was precipitated by dilution with ethyl ether-petroleum ether.

0.3 g of the 7-methyl-derivative hydrochloride was obtained. The product was purified in counter-current distribution with a solvent mixture of methyl-isobutyl-ketone ethyl acetate: n.butanol: McElvain buffer at pH 4.6 (480:480:210:210).

Upon the addition of chloroform-petroleum ether, 0.150 g of 7-methyl-6-demethyl-6-deoxytetracycline precipitated. U.V.Spectrum in MeOH/HCl 0.01N: $\lambda_{max}$270 and 343 nm.$E_{270}/E_{345}$=1.26 N.M.R.Spectrum (CDCl$_3$-DMSO-d$_6$50%):

2.17 δ (S,C$_7$—CH$_3$)
2.45 δ (S,—N(CH$_3$)$_3$)
6.21 δ((two d, J=90 Hz,C$_8$—H
7.26 δ(and C$_9$—H)

EXAMPLE 26

7-dimethylaminomethyl-6-demethyl-6-deoxytetracycline 0.5 g of 9-t.butyl-7-dimethylaminomethyl-6-demethyl-6-deoxytetracycline was dissolved in 10 ml of anhydrous hydrogen fluoride in the presence of 0.1 ml of anisole. After 24 hours at room temperature the hydrogen fluoride was evaporated under reduced pressure, and the residue was transformed into the dihydrochloride by treatment with a solution of hydrogen chloride in anhydrous methanol. The solution was diluted with n-butanol, concentrated, and the product was precipitated by dilution with ethyl ether.

Variations can, of course, be made without departing from the spirit and scope of the invention.

Having thus described the invention, what is desired to be secured by Letters Patent and hereby claimed is:

1. A process for the preparation of a compound of the formula (VII)

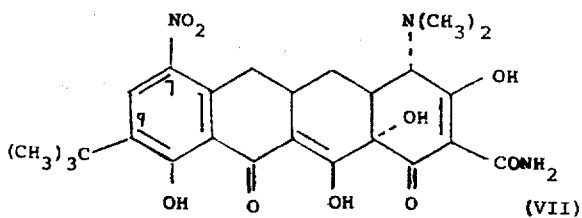

said process comprising selectively alkylating 6-demethyl-6-deoxytetracycline in the 9 position by treatment at about room temperature with a compound selected from the group consisting of t.butanol and isobutylene in the presence of a methansulfonic acid, to form a compound of the formula (VI)

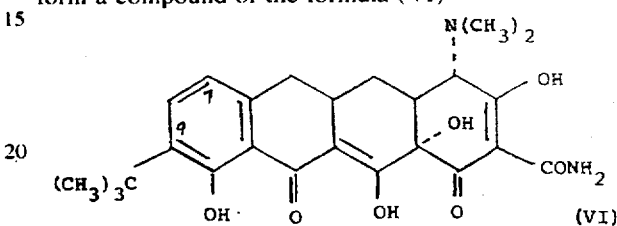

and nitrating said compound (VI) in the presence of a strong acid to form the corresponding 7-nitro-derivative of the formula (VII).

2. The process of claim 1 further comprising dissolving said compound (VII) in a solvent, effecting catalytic reduction in the presence of an aldehyde and a ketone having from 1 to 4 carbon atoms to form a compound of the formula (VIII)

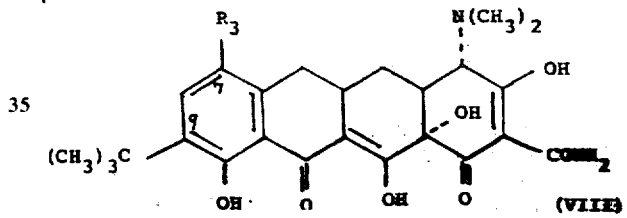

wherein R$_3$ is monoalkylamino or dialkylamino, wherein the alkyl moiety contains from 1 to 4 carbon atoms, and treating said compound (VIII) with a methansulfonic acid to eliminate the t.butyl group to thereby form a compound of the formula (V)

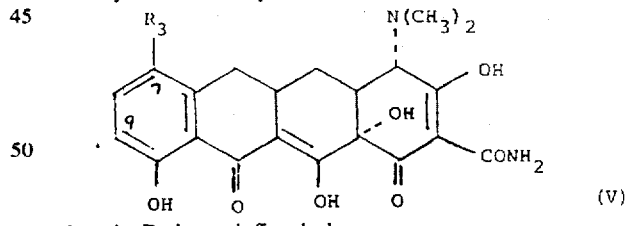

wherein R$_3$ is as defined above.

3. The process of claim 1 further comprising dissolving said 9-t.butyl-7-nitro-6-demethyl-6-deoxytetracycline in an alcohol and effecting alkylating reduction in the presence of formaldehyde and a noble metal catalyst to thereby obtain 9-t.butyl-7-dimethylamino-6-demethyl-6-deoxytetracycline.

4. The process of claim 3 wherein said catalyst is platinum or palladium.

5. The process of claim 3, further comprising treating said 9-t.butyl-7-dimethylamino-6-demethyl-6-deoxytetracycline with trifluoromethansulfonic acid to eliminate the t.butyl group in the 9 position, isolating the resulting 7-dimethyl-amino-6-demethyl-6-deoxytetracycline, and subsequently transforming this product into its salt by reaction with a pharmaceutically acceptable acid.

\* \* \* \* \*

UNITED STATES PATENT OFFICE
CERTIFICATE OF CORRECTION

Patent No. 3,901,942     Dated August 26, 1975

Inventor(s) LUIGI BERNARDI et al     Page 1 of 2

It is certified that error appears in the above-identified patent and that said Letters Patent are hereby corrected as shown below:

Column 1, line 66: "know" should read -- known --.

Column 2, line 48: "7-derivatives" should read -- 7-derivative --.

Column 5, line 56: "reduction" should read -- reductive --.

Column 6, lines 31-33:

" $R_3 = -N\begin{matrix}CH_3\\CH_3\end{matrix}$ " should read -- $R_3 = -N\begin{pmatrix}CH_3\\CH_3\end{pmatrix}$ --.

Column 7, line 10: "275" should read -- 272 --; line 42: "concentrate" should read -- concentrated --; line 47: "$\beta(C_8$-M aromatic)" should read -- $\beta(C_8$-H aromatic) --; line 63: "either" should read -- ether --; line 65: "in vacuo" should read -- "in vacuo" --.

Column 8, line 13: "N.N.R." should read -- N.M.R. --.

Column 9, line 33: "in vacuo" should read -- "in vacuo" --; line 44: "in vacuo" should read -- "in vacuo" --; line 53: "in vacuo" should read -- "in vacuo" --; lines 56-57: "in vacuo" should read -- "in vacuo" --.

UNITED STATES PATENT OFFICE
CERTIFICATE OF CORRECTION

Patent No. 3,901,942                    Dated August 26, 1975

Inventor(s) LUGIG BERNARDI et al                  Page 2 of 2

It is certified that error appears in the above-identified patent and that said Letters Patent are hereby corrected as shown below:

Column 10, line 6: "as" should read -- at --; line 57: "[$COCl_3$]" should read -- [$CDCl_3$] --.

Column 11, line 1: "in vacuo" should read -- "in vacuo" --; line 15: "$\delta(t,=7Hz,-CH_3)$" should read --$\delta(t,=7Hz,-CH_2-CH_3)$ -- line 29: "in vacuo" should read -- "in vacuo" --; line 65: "was" should read -- were --; line 66: "were" should read -- was --.

Column 12, line 26: "dissolved methanol" should read -- dissolved in methanol --.

Column 13, lines 12-13: "in vacuo" should read -- "in vacuo" --; line 43: "in vacuo" should read -- "in vacuo" --; line 47: "in vacuo" should read -- "in vacuo" --; line 67: "in vacuo" should read -- "in vacuo" --.

Column 14, line 3: "in vacuo" should read -- "in vacuo" --; line 6: "coup" should read -- crop --.

Column 15, line 39: "ketone ethyl" should read -- ketone:ethyl --.

Signed and Sealed this

Seventh Day of September 1976

[SEAL]

Attest:

RUTH C. MASON
*Attesting Officer*

C. MARSHALL DANN
*Commissioner of Patents and Trademarks*